United States Patent [19]

Snyder et al.

[11] 4,080,432

[45] Mar. 21, 1978

[54] DISSOLUTION OF POLYDIHALOPHOSPHAZENES

[75] Inventors: Dennis La Verne Snyder, Kent; Mark Lutz Stayer, Jr., Suffield, both of Ohio

[73] Assignee: The Firestone Tire & Rubber Company, Akron, Ohio

[21] Appl. No.: 606,804

[22] Filed: Aug. 22, 1975

[51] Int. Cl.$^2$ ............................................. C01B 25/10
[52] U.S. Cl. ...................................... 423/300; 423/265
[58] Field of Search ....................... 423/300, 268, 265; 260/210

[56] References Cited

U.S. PATENT DOCUMENTS

| | | | |
|---|---|---|---|
| 3,026,174 | 3/1962 | Paddock | 423/300 |
| 3,378,354 | 4/1968 | Hands | 423/300 |
| 3,669,633 | 6/1972 | Beinfest et al. | 423/300 |
| 3,755,537 | 8/1973 | Tate et al. | 423/300 |

*Primary Examiner*—Earl C. Thomas
*Assistant Examiner*—Gregory A. Heller

[57] ABSTRACT

Dihalophosphazene polymers are solubilized and stabilized whereby their tendency for gelatin or crosslinking is inhibited or overcome, by the addition of oxygen containing organic compounds such as alcohols, ketones, esters, ethers, or polyethers to hydrocarbon solvents for the polymer.

11 Claims, No Drawings

DISSOLUTION OF POLYDIHALOPHOSPHAZENES

This invention relates to the preparation of poly(dichlorophosphazenes) from which useful derivatives may be readily produced.

The derivatization of polyphosphazenes is described in the following recently issued United States Patents, and elsewhere in the open literature:

U.S. Pat. No. 3,702,833 issued Nov. 14, 1972
U.S. Pat. No. 3,515,688 issued June 2, 1970.

In each instance, the derivatives are reported to be prepared from polydichlorophosphazene starting material, usually freshly prepared by thermal polymerization of low molecular weight cyclic oligomers such as trimeric or tetrameric cyclic dichlorophosphazene. The polymerizate is often a gel as produced or turns to a gel upon standing. The gel sets into a rigid mass which is insoluble in all common solvents and which has been found to be virtually impossible to remove from the polymerization vessel.

The use of catalysts to effect the polymerization at lower temperatures and higher rates is found to increase the tendency for gel formation unless careful control is exercised.

Previous efforts to stabilize the dichlorophosphazene polymer by addition of extraneous materials have not been successful and the presence of such additives may in some instances interfere with the subsequent derivatization.

Derivatization requires a starting material which is readily dissolved since it is to be accomplished in solution as described in the above noted patents. Therefore procedure for dissolving any gel present would be particularly desirable in order to increase the yield of derivatives and to avoid fouling of the apparatus.

A principal object of this invention is to provide a means for solubilizing and stabilizing dihalophosphazene polymers, especially those prepared from low molecular weight cyclic oligomers using catalysts, e.g., as described in a copending U.S. application Ser. No. 606,802 filed concurrently herewith, whereby the tendency for gelation or crosslinking is inhibited or overcome.

A further object of the invention is to provide a method for transforming gelled polyphosphazene so as to permit the use of such product for the subsequent preparation of derivatives, and so as to facilitate cleanout and rinse of equipment in which polymerization and derivatization are conducted.

Other objects will become apparent or will be pointed out in the description which follows:

Briefly, the invention comprises the addition of oxygen containing organic compounds, particularly alcohols, to dihalophosphazene polymer, particularly essentially liner polydichlorophosphazenes represented by the general formula $(NPCl_2)_n$, in which $n$ is a number between about 10 and about 50,000. The amount of oxygen-containing organic compound which is added to the hydrocarbon solvent as a solubilizing diluent comprises up to 10% by weight of the resulting mixture and the oxygen-containing solubilizing diluent is selected from the group consisting of aliphatic alcohols, ketones, aldehydes, esters, ethers and polyethers and mixtures thereof.

The preferred additive is pentanol and the preferred mode of addition is by means of vigorous stirring.

When low molecular weight cyclic diclorophosphazene is polymerized in the presence of a Lewis Acid catalyst, e.g., as described in the above noted copending patent application, the product is usually only partially soluble in dry benzene.

The following examples are intended to illustrate the practice of this invention and are not intended to limit the same.

EXAMPLE I

Polymerization in Glass Tubes

Purified trimer (20 g) was charged to a glass tube with about 0.02 millimoles of diethylaluminum ethoxide. The tube was sealed and the material was polymerized at 245° C for 1.5 hours. The polymerizate was added to dry benzene in a sealed vessel under inert atmosphere which resulted in a swollen, insoluble mass. This swollen mass of polymerizate was divided into two parts-to part A was added 1.3% by volume of pentanol and part B was a control (no additives). Both parts were then agitated in sealed vessels under inert atmosphere at 30° C for 15–18 hours. Part A was completely dissolved with a dilute solution viscosity (DSV) equal 2.18 and a % gel = 0.0. The polymer in this state was very suitable for transferring from one reaction vessel to another and for subsequent reactions, e.g., reactions with sodium alkoxides (U.S. Pat. Nos. 3,370,020; 3,700,629; Inorg. Chem. 5, 1209 1966). Part B, on the other hand, remained a swollen, insoluble mass which would be difficult to transfer or to use in subsequent reactions.

EXAMPLE II

Polymerization in Stainless Steel Reactors

Purified trimer (471 g) was charged to a 500 ml 316 stainless steel reactor with 1.0 millimole of diethylaluminum ethoxide. Polymerization was then conducted at 205° C under inert atmosphere for 19.5 hours. Attempts to remove the polymerizate with dry benzene were unsuccessful. However, addition of 1.5% by volume of dry pentanol and additional stirring produced a smooth polymer solution that could be readily removed from the reactor and utilized in subsequent reactions described in Example I.

EXAMPLE III

To a 500 ml 316 stainless steel reactor is charged 471 g of trimer and 1.0 millimole of diethylaluminum ethoxide. The material is heated (205° C) and agitation is maintained for approximately 3 hours. After 19.5 hours the reactor is cooled sufficiently to charge benzene containing 1.5% by volume of pentanol. The polymer-solvent mixture is stirred 21 hours before it is pressured out. The polymer is obtained in 53.9% yield and has a DSV of 1.21, % gel = 0.0. There is very little hold-up in the reactor.

EXAMPLE IV 500 g of trimer and 1.1 millimoles of diethyl aluminum ethoxide are charged into a reaction vessel. After polymerizing 21 hours the temperature is lowered to 50° C and 261 g of benzene containing 1.5 g 8-hydroxyquinoline is charged into the vessel. After stirring 24.6 hours the cement is pressured out. The polymer has a yellow-green color and is completely soluble, 41% conversion, DSV 0.99 and 0.0% gel.

EXAMPLE V 20 g of purified trimer were charged to a glass tube. The tube was catalyzed with approximately .02 millimoles diethylaluminum ethoxide. After 1.5 hours polymerization at 245° C the polymer was put into benzene. The polymer became a swollen mass of "gel". The "gel" was divided into two parts. To part A was added 1.3% by volume of pentanol. Part B was the control. After overnight agitation in the 30° bath, bottle B was still a gelled mass. Bottle A (containing pentanol) was completely soluble. DSV = 3.18, % gel = 0.0.

EXAMPLE VI

To each of two bottles is charged 200 mls of a poly(-dichlorophosphazene)/dry benzene cement. Bottle A contains 1.5% by volume of dry pentanol in addition to the cement. Bottle B, the control, contains only the cement. DSV and % gel were run periodically, with these results:

Table 1

| (Days) Time | Bottle A (Pentanol) DSV | % Gel | Bottle B (Control) DSV | % Gel |
|---|---|---|---|---|
| 0 | 1.60 | 0.0 | 1.60 | 0.0 |
| 54 | 1.71 | 0.0 | 2.01 | 0.0 |
| 100 | 1.61 | 0.0 | 1.44 | 27.8 |

It was also found that the addition of pentanol would break "gel" already formed by aging. 1.5% by volume of dry pentanol was added to the control, Bottle B, and it was agitated overnight in the polymerization bath. The resulting DSV and % gel were 1.66, 0.0% respectively.

Compounds other than pentanol have proven useful for "gel" breaking as shown by the following Example:

EXAMPLE VII

Diethylaluminum ethoxide catalyzed polydichlorophosphazene polymer is divided into 4 g pieces. Each is put into a bottle with the indicated solvent and "gel" breaker additive.

Table 2

| | Additive | Amount of Additive | Solvent | Results |
|---|---|---|---|---|
| 1 | None | | $C_6H_6$ | Swollen, Viscous Mass |
| 2 | None | | Tetrahydrofuran | Lightly grainy |
| 3 | Dry Pentanol | 1.5%$_v$ | $C_6H_6$ | Viscous, Smooth |
| 4 | Dry Ethanol | 0.5%$_v$ | $C_6H_6$ | Viscous, Smooth |
| 5 | Dry Cyclohexanol | 0.5%$_v$ | $C_6H_6$ | Viscous, Smooth (slightly more viscous) |
| 6 | 8-Hydroxyquinoline | 0.5%$_w$ | $C_6H_6$ | Viscous, Smooth (slightly less viscous) |

It appears that other oxygenated solvents can be used to break "gels" including glycols, ethers and polyethers.

In addition to the solvents described above, aromatic hydroxy compounds including hydroxyquinolines may be used to break "gels".

The polydihalophosphagenes to which the present invention is particularly applicable are those prepared by catalytic polymerization of low molecular weight cyclic oligomers represented by the general formula $(NPHal_2)_n$ in which $n$ is usually between 3 and 7 and in which Hal represents a halogen selected from the group consisting of Cl, Br and I and the catalyst is an aluminum or boron compound as described in the copending application noted above, such compounds being preferably aluminium alkyls, alkoxys, halides or hydrides or mixtures of such compounds.

We claim:

1. In a process for the production of solutions of essentially linear polydihalophosphazenes suitable for the formation of completely substituted, halogen-free polydihalophosphazene derivatives, in which lower molecular weight cyclic dihalophosphazenes represented by the general formula $(NPX_2)_n$ wherein X represents halogen selected from the group consisting of Cl, Br and I and $n$ represents integers between about 3 and about 7, are thermally polymerized in the presence of a catalyst comprised of a Lewis Acid compound to form a higher molecular weight essentially linear dihalopolyphosphazene of the formula $(NPX_2)_m$ wherein $m$ represents integers between about 10 and about 50,000 and said linear polydihalophosphazene exhibits a tendency to form a gelled product when formed in the presence of said Lewis Acid compound, which gelled product must be dissolved prior to being derivatized by a reaction with alkoxy or aryloxy groups in which substantially all of the halogen atoms attached to the P atoms in the phosphazene are removed, the improvement which consists in dissolving said gelled product in a hydrocarbon solvent containing up to about 10.0% by weight of an oxygen-containing solubilizing diluent selected from the group consisting of aliphatic alcohols, ketones, aldehydes, esters, ethers and polyethers and mixtures thereof prior to derivatizing said polydihalophosphazenes in solution.

2. The process of claim 1 wherein the diluent is an aliphatic alcohol.

3. The process of claim 2 wherein the diluent is pentanol.

4. The process of claim 2 wherein the diluent is ethanol.

5. The process of claim 2 wherein the diluent is cyclohexanol.

6. The process of claim 1 wherein the diluent is diglyme.

7. The process of claim 1 wherein the diluent is tetrahydrofuran.

8. The process of claim 1 wherein the diluent is an aromatic hydroxy compound.

9. The process of claim 8 wherein the diluent is 8-hydroxyquinoline.

10. The process of claim 1 wherein the phosphazene is a polydichlorophosphazene.

11. The process of claim 1 wherein the dissolving is effected by stirring with hydrocarbon and diluent.

* * * * *

UNITED STATES PATENT OFFICE
CERTIFICATE OF CORRECTION

Patent No. 4,080,432　　　　　　　　　Dated March 21, 1978

Inventor(s) Dennis La Verne Snyder and Mark Lutz Stayer, Jr.

It is certified that error appears in the above-identified patent and that said Letters Patent are hereby corrected as shown below:

Column 1, line 57
　"liner" should be -- linear --

Column 4, line 1
　"polydihalophosphagenes" should be
　-- polydihalophosphazenes --

Signed and Sealed this

Ninth Day of October 1979

[SEAL]

Attest:

RUTH C. MASON　　　　　　　　　LUTRELLE F. PARKER
Attesting Officer　　　　　　Acting Commissioner of Patents and Trademarks